May 19, 1925. 1,538,563

C. H. LEINERT

VALVE

Filed May 31, 1923

Witness:
R. Burkhardt

Inventor:
Charles H. Leinert,
By Wilkinson, Huxley, Byron & Knight
Attys.

Patented May 19, 1925.

1,538,563

UNITED STATES PATENT OFFICE.

CHARLES H. LEINERT, OF CHICAGO, ILLINOIS, ASSIGNOR TO LEINERT VALVE COMPANY, OF CHICAGO, ILLINOIS, A CORPORATION OF ILLINOIS.

VALVE.

Application filed May 31, 1923. Serial No. 642,461.

*To all whom it may concern:*

Be it known that I, CHARLES H. LEINERT, a citizen of the United States, residing at Chicago, in the county of Cook and State of Illinois, have invented certain new and useful Improvements in Valves, of which the following is a specification.

This invention relates to a new and improved valve and more specifically to a check valve particularly adapted for use with blower engines or air compressors or the like.

The present application is in the nature of an improvement on the device shown in my prior Patent No. 1,404,130, granted January 17, 1922.

Valves of this type are operated at high speed and are repeatedly seated and unseated in their operation. This speed and constant use causes considerable wear of the valve member. The valve member in my prior construction was actuated by springs, all of which extended circumferentially in the same direction. With this form of construction, there is a tendency for a slight twisting motion of the valve plate in its seating and unseating movement. This twisting tendency adds to the wear caused by the operation of the valve.

It is an object of the present invention to provide a new and improved valve actuating spring construction for use in connection with valves of the character described.

It is a further object to provide a spring construction adapted to support a valve member, the springs having portions extending in opposite directions whereby any twisting tendency is counteracted.

It is an additional object to provide a spring construction which supports the valve member in a manner to minimize sag of the valve and to effectively cushion the valve seat while at the same time causing a rapid unseating of the valve.

Other and further objects will appear as the description proceeds.

I have illustrated certain preferred embodiments of my invention in the accompanying drawings, in which.

Figure 1:
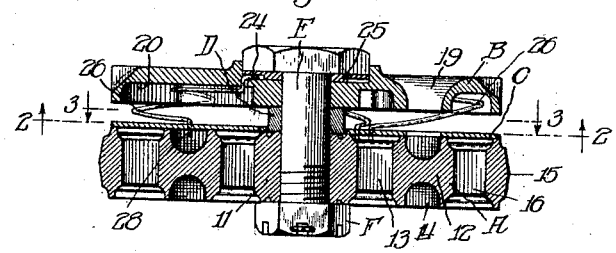
Figure 1 is a transverse section of one form of valve.

The valve assembly as shown comprises the seat member A, the abutment member B and the valve member C, these three members being secured in adjusted relation by means of collar D, bolt E and nut F. The seat member A comprises the hub 11 from which the inner circumferential portion 12 is supported by spokes 13. The portion 12 is provided with the circumferential channels 14. The rim portion 15 is supported from portion 12 by spokes 16.

Figure 3:
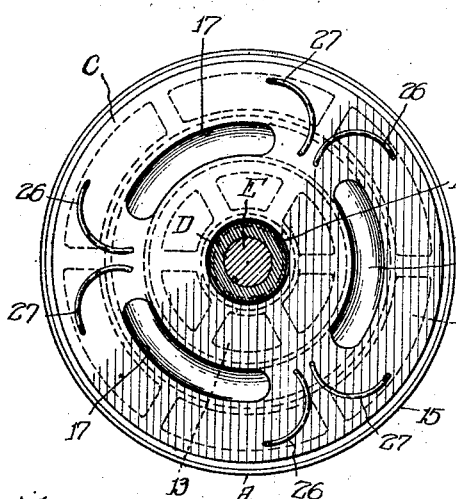
Figure 3 is a section taken on line 3—3 of Figure 1.

The valve member C as best shown in Figure 3 is provided with the spaced circumferential openings 17 which register with the groove 14 of the seat member A. The valve member C is provided with the central opening 18 which loosely fits about the collar D.

Figure 2:
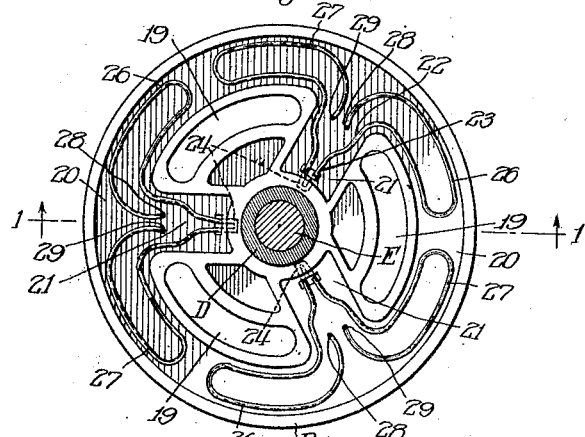
Figure 2 is a section taken on line 2—2 of Figure 1.

The abutment member B is provided with a plurality of spaced circumferential openings 19 adapted to register with the openings 17 in the valve member. As best shown in Figure 2 this member B is provided with a circumferentially extending recess 20 which has the inwardly extending portions 21 extending in toward the hub between the openings 19.

The springs 22 shown in Figure 2 have a central portion 23 which extends through a slot 24 in the abutment member B and is secured under the washer 25 which fits under the head of the bolt E. This washer 25 is preferably formed of soft metal such as copper so that it deforms under pressure and thus rigidly secures the springs in place. The springs 22 are provided with oppositely extending arms 26 and 27 which are formed with a reverse bend so that their ends 28 and 29 are adjacently located. It will be noted that the free ends of the spring arms are directed inwardly toward the central securing portion of the spring and that the valve member is thus supported at points inwardly of its periphery. These ends 28 and 29 extend through perforations in the valve plate C and retain the plate in proper relation to the other members of the assembly.

Figure 4:
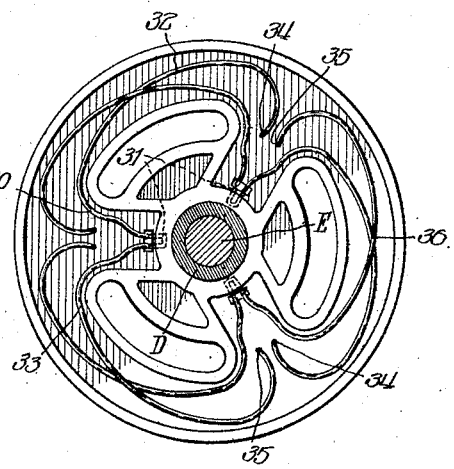
Figure 4 is a view similar to Figure 2 but showing a modified form of construction.

In the form of construction shown in Figure 4, the springs 30 are provided with a central portion 31 secured in the same manner as that just described. The springs 30 are provided with the oppositely extending arms 32 and 33 which extend approximately circumferentially and are extended inwardly and provided with up-turned ends 34 and 35 at points adjacent the central portions of the adjacent springs. Each end 35 of a spring is located adjacent the end 34 of a similar spring. Where the spring arms cross, the upper arm is curved upwardly as indicated at 36 so that there will be no frictional wear between the two arms. The spring ends are secured to the valve plate in a manner similar to that shown in connection with the spring ends of Figure 1.

In both forms of the device shown, the valve plate is supported by resilient means which extend in opposite directions and which resist any tendency for the valve plate to twist or have a rotary motion about its axis. The seating of the valve is thus limited to a direct reciprocatory motion and wear between the valve and valve seat is minimized. This support of the valve by oppositely extending springs also makes for stiffness and minimizes any tendency for the valve plate to sag relative to the abutment member.

It has been found that springs of these types afford a gradually increasing resistance to movement of the valve member from its seat to its open position against the abutment member and thus cushion the engagement with the abutment member. In the reverse action of the valve, the springs operate to quickly and efficiently force the valve from the abutment member and return it to its seat.

While I have illustrated certain preferred embodiments of my invention, these are understood to be illustrative only and I contemplate such changes and modifications as come within the scope of the appended claims.

I claim:

1. In a valve for blowers or the like, the combination of a seat member, an abutment member located adjacent the seat member, a valve member interposed between the abutment member and seat member, and a plurality of circumferentially extending resilient means engaging the valve member and adapted to maintain it normally in engagement with the seat, adjacent resilient means extending oppositely whereby twist of the valve member is prevented.

2. In a valve for blowers or the like, the combination of a seat member, an abutment member located adjacent the seat member, a valve member interposed between the abutment member and seat member, and a plurality of circumferentially extending springs engaging the valve member and adapted to maintain it normally in engagement with the seat, certain of said springs extending in one direction from their point of engagement with the valve member and others extending in an opposite direction whereby twist of the valve member is prevented.

3. In a valve for blowers or the like, the combination of a seat member, an abutment member located adjacent the seat member, a valve member interposed between the abutment member and seat member, and a plurality of springs engaging the valve member and adapted to maintain it normally in engagement with the seat, said springs being provided with arms, pairs of arms engaging the valve member at adjacent points, the adjacent arms extending in opposite directions.

4. In a valve for blowers or the like, the combination of a seat member, an abutment member located adjacent the seat member, a valve member interposed between the abutment member and seat member, and a plurality of circumferentially extending springs engaging the valve member and adapted to maintain it normally in engagement with the seat, said springs each comprising a pair of oppositely extending arms, the central portion of the spring being secured to the abutment member and the ends of the arms being secured to the valve member.

5. In a valve for blowers or the like, the combination of a seat member, an abutment member located adjacent the seat member, a valve member interposed between the abutment member and seat member, and a plurality of springs engaging the valve member and adapted to maintain it normally in engagement with the seat, said springs each comprising a pair of oppositely extending arms, the central portion of the spring being secured to the abutment member and the ends of the arms being secured to the valve member, oppositely extending spring arms engaging the valve member at closely adjacent points.

6. In a valve for blowers or the like, the combination of a seat member, an abutment member located adjacent the seat member, a valve member interposed between the abutment member and seat member, and a plurality of springs engaging the valve member and adapted to maintain it normally in engagement with the seat, said springs each comprising a pair of oppositely extending arms, the central portion of the spring extending through slots in the abutment member and being secured thereto and the ends of the arms being secured to the valve member.

7. In a valve for blowers or the like, the combination of a seat member, an abutment member located adjacent the seat member, a valve member interposed between the abutment member and seat member, and a plurality of springs engaging the valve member and adapted to maintain it normally in engagement with the seat, said springs each comprising a pair of oppositely extending arms, the arms being formed with return bends whereby the ends of the arms are adjacently located, said adjacent ends engaging the valve member.

8. In a valve for blowers or the like, the combination of a seat member, an abutment member located adjacent the seat member, a valve member interposed between the abutment member and seat member, and a plurality of springs engaging the valve member and adapted to maintain it normally in engagement with the seat, said springs each comprising a pair of oppositely extending arms, the arms being formed with return bends whereby the ends of the arms are adjacently located, said adjacent ends engaging the valve member, the central portions of the springs extending through slots in the abutment member and being secured thereto.

9. In a valve for blowers or the like, the combination of a seat member, an abutment member located adjacent the seat member, a valve member interposed between the abutment member and seat member, and a plurality of springs engaging the valve member and adapted to maintain it normally in engagement with the seat, said springs comprising oppositely extending arms, said arms having circumferentially extending portions, and having radially inward extending portions adjacent the point of engagement with the valve.

10. In a valve for blowers or the like, the combination of a seat member, an abutment member located adjacent the seat member, a valve member interposed between the abutment member and seat member, and a plurality of springs engaging the valve member and adapted to maintain it normally in engagement with the seat, said springs comprising oppositely extending arms, said arms having circumferentially extending portions, and having radially inward extending portions adjacent the point of engagement with the valve, the points of engagement between spring and valve being adjacent the point of engagement of the spring and abutment member.

Signed at Chicago, Illinois, this 25th day of May, 1923.

CHARLES H. LEINERT.